United States Patent [19]

Eline

[11] 4,260,037
[45] Apr. 7, 1981

[54] ASSEMBLY FOR SILENCING ENGINE COOLING FAN NOISE

[75] Inventor: Claude J. Eline, Loury, France

[73] Assignee: Deere & Company, Moline, Ill.

[21] Appl. No.: 89,078

[22] Filed: Oct. 29, 1979

[51] Int. Cl.³ .................. B62D 25/10; E04B 1/82; F01N 1/02; F01N 1/24

[52] U.S. Cl. .................. 181/204; 181/225; 181/258; 181/286; 181/288; 180/69 R; 165/135

[58] Field of Search ............ 181/204, 211, 258, 284, 181/286, 288, 292, 293, 225, 258; 180/54 A, 68 P, 69 R; 165/126, 135; 123/41.49, 41.66, 198 E

[56] References Cited

U.S. PATENT DOCUMENTS

| | | | |
|---|---|---|---|
| 3,762,489 | 10/1973 | Proksch et al. | 181/204 X |
| 3,820,629 | 6/1974 | Carlson et al. | 180/69 R X |
| 3,897,850 | 8/1975 | Thompson et al. | 181/204 |
| 4,169,501 | 10/1979 | Takeuchi et al. | 181/225 X |

*Primary Examiner*—L. T. Hix
*Assistant Examiner*—Benjamin R. Fuller

[57] ABSTRACT

A sound absorbing and attenuating panel is located at one end of an engine compartment for silencing the noise generated by an engine cooling fan located in the compartment. The panel includes a first set of laterally spaced, vertically extending silencing units comprising sound absorbing material encased in perforated containers and a second set of silencing units located one each between each of the first set of units and each comprising a container defining a combination of a pair of resonator chambers separated by a cavity filled with sound absorbing material.

3 Claims, 4 Drawing Figures

ASSEMBLY FOR SILENCING ENGINE COOLING FAN NOISE

BACKGROUND OF THE INVENTION

The present invention relates to noise silencing panels for vehicles and more particularly relates to such panels as are used to silence the noise generated by engine cooling fans.

Typically, a fan generates low frequency noise related to the blades passage and its harmonics and high frequency broad band aerodynamic noise. Conventional designs for silencing fan noise have included a plurality of spaced sound absorbing units or baffles comprising perforated casings filled with sound absorbing material. An example of such a structure is disclosed in U.S. Pat. No. 3,897,850 granted to Thompson et al on Aug. 5, 1975. While structures of this sort do attenuate noise in the mid to high frequency range, they are not particularly effective in attenuating noise in the low frequency range.

SUMMARY OF THE INVENTION

According to the present invention there is provided a novel panel for silencing engine cooling fan generated noise.

A broad object of the invention is to provide a silencing panel capable of effectively attentuating low, mid and high frequency noise generated by a fan.

A more specific object is to provide a silencing panel having spaced silencing baffles or units including a first set of baffles comprising perforated casings containing noise absorbing material and a second set of baffles respectively arranged between adjacent ones of the first set of baffles and each comprising a casing defining a pair of resonator chambers separated by perforated cavity containing sound absorbing material.

These and other objects will become apparent from reading the ensuing description together with the appended drawing.

DESCRIPTION OF THE PREFERRED EMBODIMENT

Figure 1:
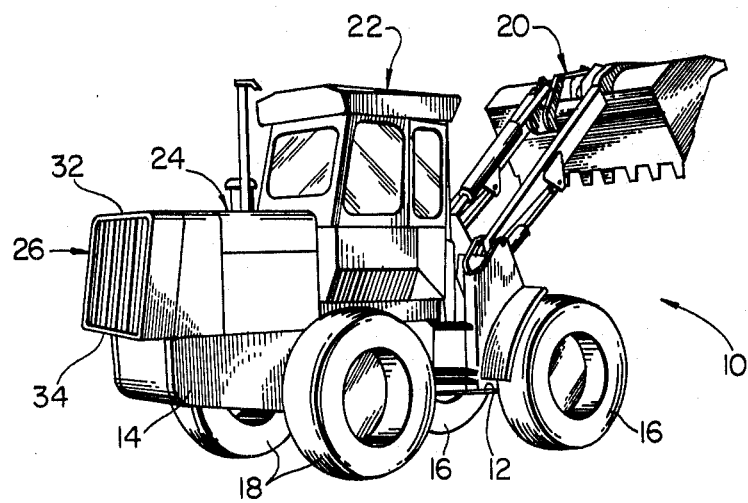
FIG. 1 is a right rear perspective view of an industrial loader embodying the present invention.

Referring now to FIG. 1, therein is shown an industrial vehicle in the form of an articulated wheel loader indicated in its entirety by the reference numeral 10. The vehicle 10 includes front and rear frame sections, 12 and 14 respectively, supported by front and rear sets of ground wheels 16 and 18 and interconnected by a vertical pivot assembly (not shown). A loader structure 20 is supported on the front frame, section 12. Supported on the forward end of the rear frame section 14 is an operator's cab 22 and located on the frame section 14 behind the cab is an engine compartment 24 in which is located an engine (not shown).

Figure 2:
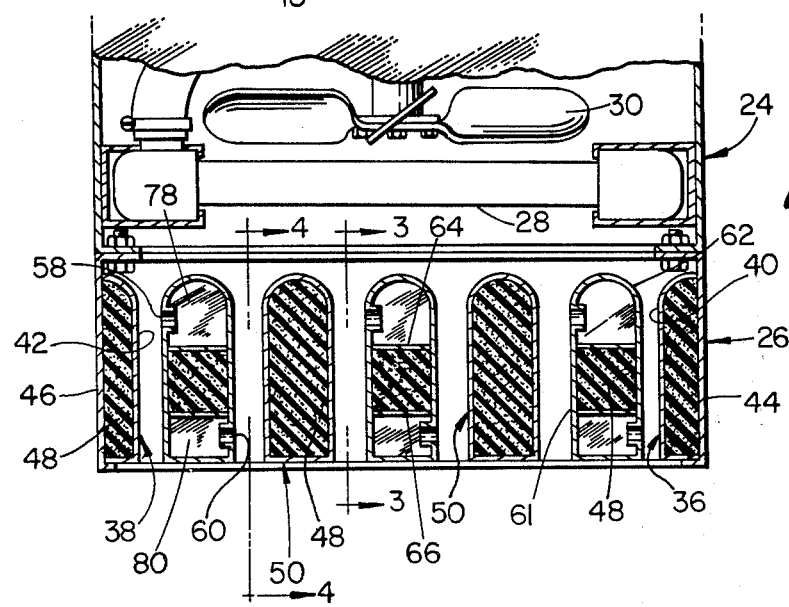
FIG. 2 is a horizontal sectional view taken through the rearward end of the engine compartment and showing the relationship of the silencer panel to the radiator and fan.
Figure 3:
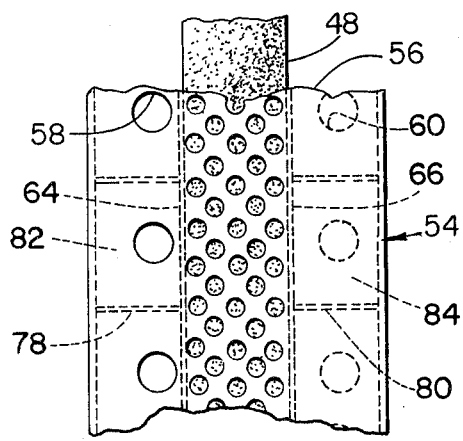
FIG. 3 is a view taken along line 3—3 of FIG. 2 showing a portion of one of the types of baffles.
Figure 4:
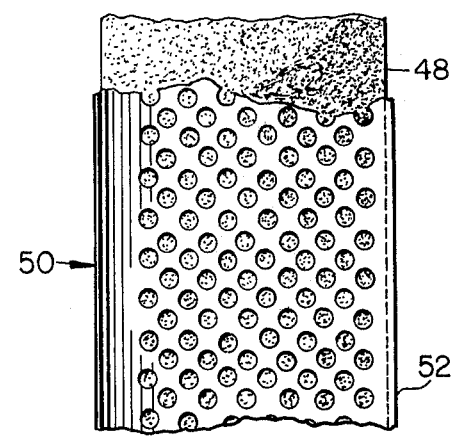
FIG. 4 is a view taken along line 4—4 of FIG. 2 showing a portion of another of the types of baffles.

The rear end of the compartment 24 is defined by a noise silencing panel 26. As can best be seen in FIG. 2, the panel 26 is located rearwardly of an engine coolant radiator 28 which is positioned just rearwardly of an engine cooling fan 30.

The panel 26 includes an open-ended rectangular framework including top and bottom walls, 32 and 34 respectively, between which extend a plurality of parallel, spaced sound attenuating baffles or units. Specifically, the sound attenuating baffles include a first set comprising, as viewed in FIG. 2, right and left half-baffles, 36 and 38 respectively, comprising perforated half-casings 40 and 42 which cooperate with side walls 44 and 46, respectively, to define cavities in which is placed a suitable sound absorbing material 48. The first set of baffles further includes a pair of identical spaced apart whole baffles 50 each comprising a perforated casing 52 containing the sound absorbing material 48.

Located one each between the pair of whole baffles 50 and between one of the whole baffles 50 and the half-baffle 36 and between the other whole unit 50 and the half baffle 38 are three identical baffles or units 54 which comprise a second set of baffles or units. The baffles 54 each include a casing 56 shaped similarly to the casings 52 of the first set of baffles but having front and rear sets of vertically spaced holes 58 and 60, respectively, located in opposite side walls 61 and 62 of the casing 56 in vertical zones spaced fore-and-aft from each other. Located in the casing 56 between the sets of holes 58 and 60 are front and rear, vertical, perforated partitions 64 and 66, respectively, extending between the walls 61 and 62 and cooperating therewith to define a cavity which is filled with a quantity of the sound absorbing material 48. Located so as to be between adjacent ones of the holes 58 are horizontal partitions 78 while a similar set of horizontal partitions 80 are respectively located between adjacent ones of the holes 60. Thus, the partitions 78 cooperate with the walls 61 and 62 and the partition 64 to define a plurality of resonator chambers 82 each having a hole 58 leading therein while the partitions 80 cooperate with the walls 61 and 62 and the partition 66 to define a plurality of resonator chambers 84 each having a hole 60 leading thereinto. The volume of the resonator chambers 82 and 84 and the size of the hole 58 and 60 are selected to give the optimum level of attenuation of low frequency noise for a given application.

The operation of the invention is thought to be understood from the foregoing description suffice it to say that the baffles 36, 38 and 50 are operative to absorb and attenuate noise in the mid and high frequency ranges generated by the fan 30 while the baffles 54 are operative to absorb or attenuate noise in the low frequency range.

I claim:

1. A sound absorbing and attenuating panel adapted for use in silencing noises emitted by a vehicle fan, comprising: a generally rectangular framework having top and bottom sides; a plurality of baffles including hollow casings extending between the top and bottom sides and being spaced from each other to define air flow passages therebetween; said baffles including first and second sets of baffles with the baffles of the first set being arranged alternately with the second set; the casing of each baffle of the first set being perforated and being filled with a sound absorbing material; the casing of each baffle of the second set being partitioned into a plurality of resonator chambers and being provided with a plurality of holes arranged one each for each chamber and disposed crosswise to an intended direction of air flow through the air flow passages.

2. The panel defined in claim 1 wherein the plurality of chambers of each of the baffles of the second set are defined in part by at least one perforated partition; each of the baffles of the second set including hollow cavity means defined therein separate from the plurality of chambers and defined in part by the perforated partition; and the hollow cavity means being filled with sound absorbing material.

3. The panel defined in claim 2 wherein the plurality of chambers of each of the baffles of the second set is defined by a pair of spaced, vertically extending perforated partitions located in the casing in cross-wise relationship to the intended direction of air flow through the air flow passages and respectively in spaced relationship to upstream and downstream ends of the baffle and said pair of perforated partitions cooperating with the casing to define the cavity means; a first set of horizontal vertically spaced partitions extending between the upstream end of the casing and one of the pair of the perforated partitions to thereby define a first set of the resonator chambers; a second set of horizontal, vertically spaced partitions extending between the downstream end of the casing and another of the pair of perforated partitions to thereby define a second set of the resonator chambers; and the holes leading to the first set of chambers being located on an opposite side of the casing from the holes leading to the second set of chambers.

* * * * *